United States Patent [19]
Boetzel et al.

[11] Patent Number: 6,078,574
[45] Date of Patent: Jun. 20, 2000

[54] PROCESS AND APPARATUS FOR ACTION CONTROL IN A TIME SLOT METHOD

[75] Inventors: Ulrich Boetzel, Kaarst; Michael Huetwohl, Essen; Andreas Funke, Hamm, all of Germany

[73] Assignee: Siemens Aktiengesellschaft, Munich, Germany

[21] Appl. No.: 08/940,474

[22] Filed: Sep. 30, 1997

[30] Foreign Application Priority Data

Sep. 30, 1996 [DE] Germany .................. 196 40 315

[51] Int. Cl.⁷ .................................................. H04J 3/06
[52] U.S. Cl. ...................... 370/337; 370/349; 370/350
[58] Field of Search ............................ 370/337, 347, 370/350, 321, 324, 503, 516; 371/47.1; 455/11.1, 13.2, 67.1

[56] References Cited

U.S. PATENT DOCUMENTS

| 3,838,221 | 9/1974 | Schmidt et al. ........... 370/324 |
| 5,426,642 | 6/1995 | Tanabe ................... 370/324 |
| 5,796,730 | 8/1998 | Bellec .................... 370/347 |

FOREIGN PATENT DOCUMENTS

| 0486692A1 | 5/1992 | European Pat. Off. . |
| 3627135A1 | 2/1988 | Germany . |

OTHER PUBLICATIONS

"Ics for Communications", Siemens Data Sheet, Sep. 6, 1995, pp. 1–100.

"Struktur des DECT–Standards" (Ulrich Pilger), Nachrichtentechnik, Elektron, Berlin 42, 1992, pp. 23–27.

Primary Examiner—Hassan Kizou
Assistant Examiner—Mitchell Slavitt
Attorney, Agent, or Firm—Herbert L. Lerner; Laurence A. Greenberg; Werner H. Stemer

[57] ABSTRACT

A TDMA radio system, for example according to the DECT standard, requires counters which control actions. A process and an apparatus for action control in a time slot method include three counters, a reference counter, an even bit working counter for actions in time slots with even time slot numbers, and an odd bit working counter for actions in time slots with odd time slot numbers. The two working counters are loaded with an offset when the reference counter reaches specific counts. Specific actions can be initiated when the two working counters reach specific counts.

4 Claims, 2 Drawing Sheets

PROCESS AND APPARATUS FOR ACTION CONTROL IN A TIME SLOT METHOD

BACKGROUND OF THE INVENTION

Field of the Invention

The invention relates to a process and an apparatus for action control in a time slot method.

Time slot methods are used, for example, for cordless telecommunications systems based on a digital transmission technique. Those telecommunications systems use Time Division Multiple Access (TDMA) as access to the spectrum. The invention can be applied, for example to the DECT (Digital Enhanced Cordless Telecommunications) Standard.

A TDMA time slot method radio system requires timers to control the timing of actions in individual time slots. Those timers are also called counters or bit counters in the following text. They may be used for bit, time slot, frame and multi-frame synchronization and time.

The PMB 2727 DECT Multichannel Burst Mode Controller ("MBMC") is known from the prior art. That module includes only the functionality of a base station. The PMB 2727 includes a bit counter for the transmitting phase (=TX bit counter) and a bit counter for the receiving phase (=RX bit counter). The time sequence of the first 12 transmitting time slots is governed by the TX bit counter, and that of the second 12 receiving time slots by the RX bit counter. However, in that case, the receiving phase is always subject to the problem of it being possible for a time slot which is received too late to collide with the next time slot which, under some circumstances, is received early. That collision does not just occur because of the guard space between two receiving time slots being used up by the distance between the mobile parts, but as a result of the fact that receiving time slots have to be provided even before reception, by locking on the receiver.

In the case of DECT, the guard space bit width includes 56 bits. Of those, 12 bits are lost because of the preparatory task for the second receiving time slot, being used to switch on the receiver. Final tasks relating to the preceding time slot last until about bit No. 436. Thus, 480−436−12=32 bits remain for the distance between the mobile part and the base station. However, an optimum base station should be able to use the possible 56 bits in the guard space duration without being limited by the implementation in baseband. In the case of a repeater, the method which is known from the PMB 2727 can be implemented only with a very high level of complexity and with a high risk level in terms of functionality.

SUMMARY OF THE INVENTION

It is accordingly an object of the invention to provide a process and an apparatus for action control in a time slot method, which overcome the hereinafore-mentioned disadvantages of the heretofore-known processes and apparatuses of this general type and which solve the problem of timers and bit and frame synchronization.

With the foregoing and other objects in view there is provided, in accordance with the invention, a process for action control in a time slot method, which comprises providing a reference counter; providing a first working counter for actions in time slots with even time slot numbers; providing a second working counter for actions in time slots with odd time slot numbers; loading the first working counter with a specific value when the reference counter reaches a specific count during a time slot with an odd time slot number; loading the second working counter with a specific value when the reference counter reaches a specific count during a time slot with an even time slot number; and initiating specific actions when the working counters reach specific counts.

One advantage of the invention is the simple generation of the times which are used to initiate actions. The solution according to the invention enables simple, exact timing of the individual actions. The time sequencing of the individual actions can thus take place in accordance with a fixed pattern.

In accordance with another mode of the invention, there is provided a process which comprises using a distance between a base part and a mobile part or a repeater to determine the value loaded in the working counter provided for a receiving time slot. This process has the advantage of permitting actions whose occurrence in time may occur exactly at the desired time to be initiated even during a time slot.

The method according to the invention can be used both for mobile part stations and for repeaters.

In accordance with a further mode of the invention, there is provided a process which comprises resynchronizing the working counters with a reception of respective synchronization fields. This process has the advantage of providing even more exact definition of the time of occurrence of a desired action.

With the objects of the invention in view there is also provided an apparatus for action control in a time slot method, comprising a reference counter; a first working counter for actions in time slots with even time slot numbers; a second working counter for actions in time slots with odd time slot numbers; the first working counter loaded with a specific value when the reference counter reaches a specific count during a time slot with an odd time slot number; the second working counter loaded with a specific value when the reference counter reaches a specific count during a time slot with an even time slot number; and specific actions being initiated when the working counters reach specific counts.

Other features which are considered as characteristic for the invention are set forth in the appended claims.

Although the invention is illustrated and described herein as embodied in a process and an apparatus for action control in a time slot method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now in detail to the figures of the drawings, it is seen that according to the invention, the process for action control includes three bit counters, namely a reference bit counter RefBC (or reference counter), an even bit working counter EBWC (=first working counter or working counter for time slots with even time slot numbers) and an odd bit working counter OBWC (=second working counter or working bit counter for time slots with odd time slot numbers). When the reference bit counter RefBC reaches a specific count, the odd bit working counter OBWC, that is to say the counter for time slots with an odd time slot number, is loaded with a specific value (=offset). During a time slot with an even time slot number, and if the reference bit counter has reached a specific count, the odd bit working counter OBWC, that is to say the working bit counter for time slots with an odd time slot number, is loaded with a specific value WCV2. The counts of the two working counters OBWC, EBWC thus have a fixed relationship to the count of the reference bit counter RefBC. Specific actions can then be initiated when the working counters reach specific counts.

In principle, the invention is suitable for all TDMA methods. The invention will be described in more detail in the following text using the example of DECT.

Figure 1:
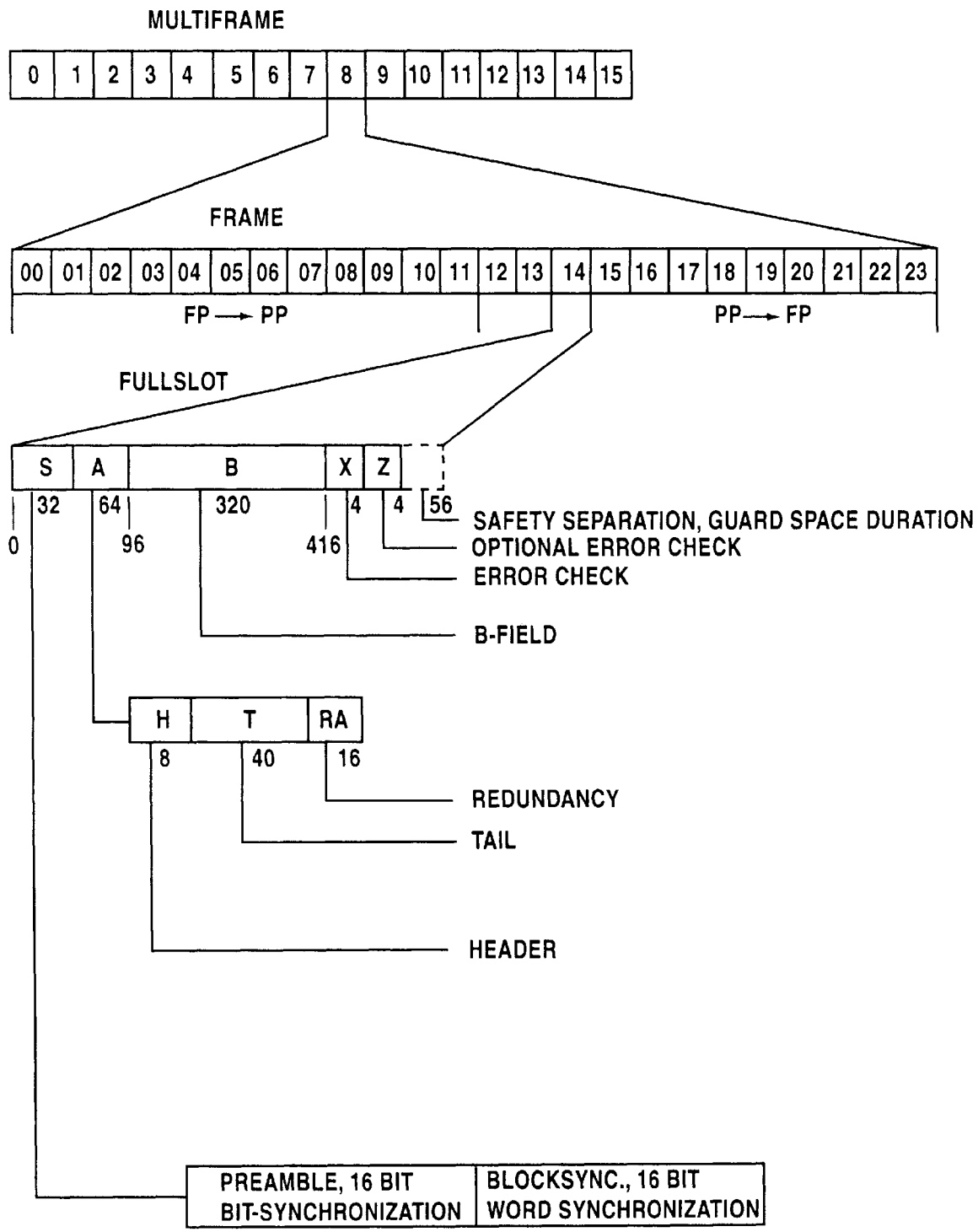
FIG. 1 is a diagram of a DECT frame structure.

FIG. 1 shows a DECT frame structure. A multiframe contains 16 frames. A frame has a frame time duration of 10 ms, which corresponds to 11,520 bits. The frame is split into 2.12 full slots of equal size, which are also called slots or time slots in the following text. In FIG. 1, these are denoted by numbers 00, 01, 02, . . . 23. A base station, which is also called a fixed part FP, transmits to mobile parts, which are also called handsets or portable parts PP, for the first 5 ms. In the second 5 ms, the base station receives the data from the mobile parts PP. This sequence is reversed in a mobile part PP, that is to say it receives for 5 ms (=12 time slots) and then transmits for 5 ms (=12 time slots). A pair of time slots (transmitting and receiving) at an interval of 12 time slots in each case forms a connection (=channel).

Each time slot lasts for 416 ms, which corresponds to 480 bits. A time slot is split into a synchronization field S, which has a length of 32 bits and is also called a Sync field in the following text, a 64-bit long A field used for signaling, a 320-bit long B field containing voice data, a 4-bit long X field, a 4-bit long Z field and a safety field which lasts for about 50 μs (56 bits) and is also called a guard space or guard space duration.

The X field is used for error checking on 84 bits in the B field, if the B field is unprotected. The Z field is an optional error check, achieved by doubling the X field.

The S field is split into 16 bits for bit synchronization and a further 16 bits for word synchronization.

The A field is formed of a header H (8 bits), a tail T (40 bits) and 16 bits of redundancy. Further details of the DECT frame structure can be found in the European Telecommunication Standard ETS 300 175-2 and ETS 300 175-3.

In a mobile station PP, there are precisely 5 ms between reception and transmission, measured at the antenna. In the base station FP, transmission takes place at a fixed time, the signal is delayed by n μs over the propagation distance, is received by the mobile station PP and is transmitted after 5 ms, with a delay of n μs occurring once again over the radio path, and is then received by the base station FP. In this case, a time interval $\Delta t_{SE}$ between the transmission of the signals from the base station FP and the reception of the signals at the base station FP is given by:

$$\Delta t_{SE}=5 \text{ ms}+2\cdot n\mu s \text{ (delay in the air)}$$

For this reason, reception in the receiving time slots can occur at different times, depending on the distance to the mobile station PP. In the case of a cordless private branch exchange, this time difference is barely perceptible since the mobile parts PP can be operated at a maximum distance of 300 m and thus, with regard to DECT, occur a maximum of 1–2 bits later than the expected 5 ms delay. 150 m corresponds to about 1 μs, which is equivalent to about 1 bit.

However, in an application for a radio link between telephony subscribers, the delay times in the air are considerably longer so that, for a distance of 3000 m between the base station FP and the mobile part PP the delay is 20 bits. If a second mobile part PP is located in the immediate vicinity of the base station FP for this purpose, then the 12 receiving time slots at the base station FP receive at greatly different times.

In the sense of a base station and a mobile station, a repeater has the capability both to transmit and to receive in all 24 time slots in a frame. That is to say a receiving time slot can be followed immediately by a transmitting time slot, which can be followed, once again, by a receiving time slot. Since a repeater must ensure both base station functionality and mobile part functionality, correct sequencing of the time slots must be ensured.

Figure 2:
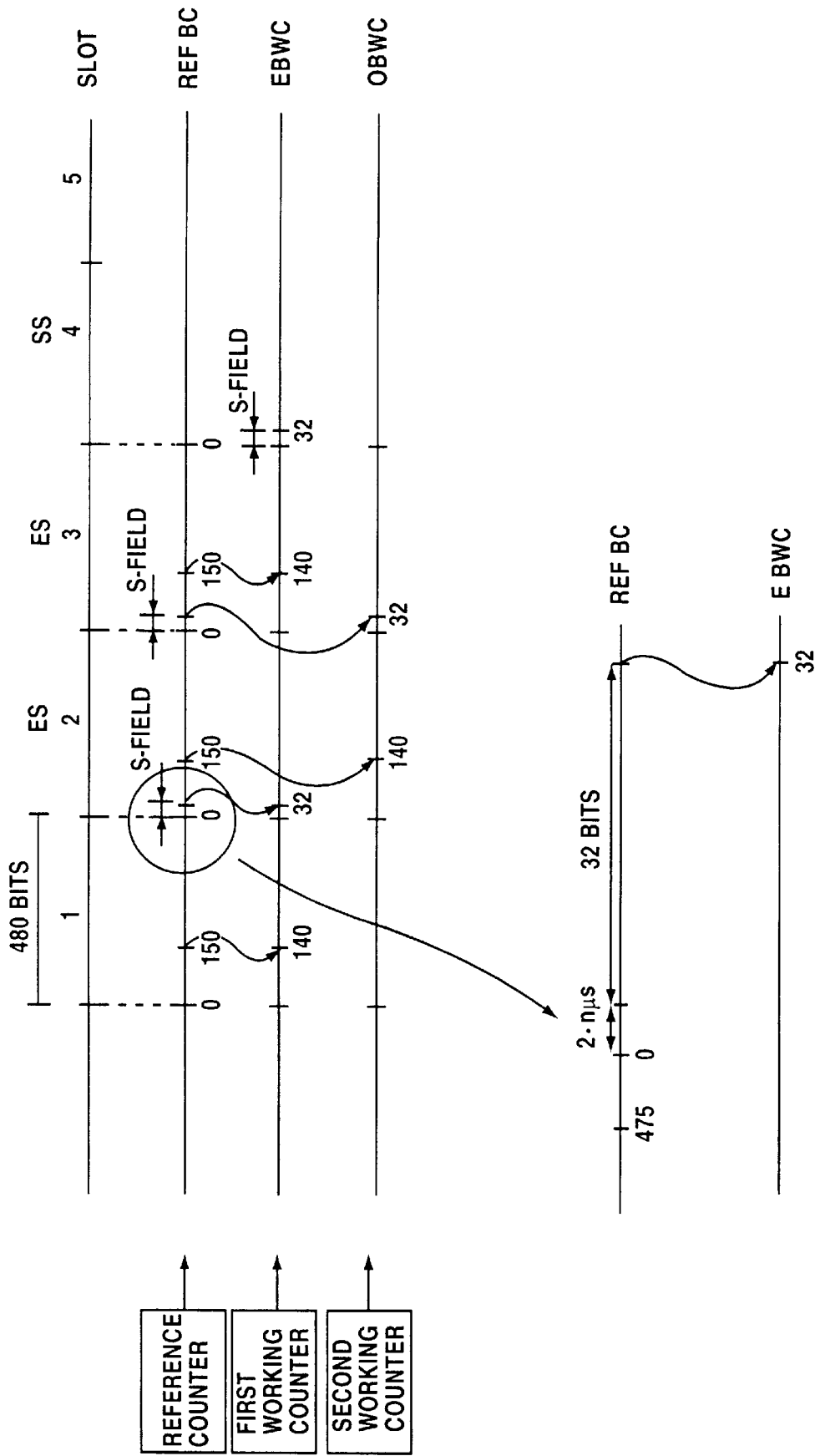
FIG. 2 is a timing diagram for three bit counters according to the invention, and a detailed view of an S-field environment.

FIG. 2 shows a timing diagram for three bit counters according to the invention. The reference bit counter RefBC is varied only by frame synchronization and runs without any disturbance from 0 to 479. In time slots with even time slot numbers (slots 2, 4, 6 . . . ), the odd bit working counter OBWC for the time slot with an odd time slot number is preloaded with the phase offset with respect to the reference bit counter required later. For example, if the reference bit counter RefBC is at the value 150 in slot 2, the offset (=working bit counter value 2 WCV2) is loaded with 140 in the odd bit working counter OBWC. In the same way, the even bit working counter EBWC for the time slot with an even time slot number is preloaded in the preceding time slot, for example with an offset of 140 if the count of the reference bit counter RefBC in slot 3 is 140. If the even bit working counter EBWC is then used for reception in a time slot, the odd bit working counter OBWC can be preloaded during reception in this time slot and, while the even bit working counter EBWC is still carrying out the completion of the preceding time slot, the odd bit working counter OBWC is already processing the next time slot. This concept having three bit counters allows applications with greatly delayed time slots (radio local loop) to be set up in a simple manner. The use of a radio part which has no settling time between two time slots permits this concept to be used to achieve a maximum range for a given guard space.

In order to receive slots ES, the corresponding working bit counter OBWC or EBWC is resynchronized as soon as the SYNC field has been identified, that is to say it is loaded with the value 32. The SYNC field is identified at the end of the SYNC field.

In the case of transmitting slots SS, the phase shift between the counters RefBC and OBWC or EBWC remains.

FIG. 2 shows a receiving time slot as ES (receiving slot) and a transmitting time slot as SS (transmitting slot). The S field starts 2·n μs after the reference bit counter RefBC has reached 0.

A time slot may be a full, half or double slot. The length (number of bits) of the slots can be found in the DECT Standard. For example, a half slot has a length of 240 bits.

A frame contains 24 time slots if full slots are used, 48 if half slots are used and 12 if double slots are used. A full slot always starts at a full slot boundary. The timeframe for half slots is fixed at 10 ms/48.

This allows deviations from the timeframe of 24 time slots as described above for DECT to be implemented to allow double time slots or half time slots to be used.

The slot numbering used herein differs from the standardized DECT numbering.

The invention can be applied to the TDMA standard PWT (Personal Wireless Telecommunications), which is standardized in the U.S.A. as TIA/EIA-622. PWT is a derivative of the DECT Standard. The major difference between PWT and DECT occurs in the physical layout. While DECT uses GFSK modulation and the frequency band is 1880–1900 MHz (10 channels), PWT operates with Pi/4-D-QPSK modulation in the frequency band 1910–1930 MHz (16 channels). Due to the different modulation method, the Sync word differs from the DECT Sync word. The slot and frame structure (A-filed, B-field, XCRC, Z-field, 24 full slots, etc.) is otherwise identical to DECT. All of the solution proposals which relate to time slot synchronization (bit counter concepts) are thus applicable to both DECT and

We claim:

1. A process for execution control in a time division multiple access method, which comprises:

providing a reference counter;

providing a first working counter for actions in time slots with even time slot numbers;

providing a second working counter for actions in time slots with odd time slot numbers;

loading the first working counter with a specific value when the reference counter reaches a specific count during a time slot with an odd time slot number;

loading the second working counter with a specific value when the reference counter reaches a specific count during a time slot with an even time slot number; and initiating specific actions when the working counters reach specific counts.

2. The process according to claim 1, which comprises using a distance between a base part and a mobile part or a repeater to determine the value loaded in the working counter provided for a receiving time slot.

3. The process according to claim 1, which comprises resynchronizing the working counters with a reception of respective synchronization fields.

4. An apparatus for execution control in a time division multiple access method, comprising:

a reference counter;

a first working counter for actions in time slots with even time slot numbers;

a second working counter for actions in time slots with odd time slot numbers;

said first working counter loaded with a specific value when said reference counter reaches a specific count during a time slot with an odd time slot number;

said second working counter loaded with a specific value when said reference counter reaches a specific count during a time slot with an even time slot number; and specific actions being initiated when said working counters reach specific counts.

* * * * *